(12) United States Patent
Yeh et al.

(10) Patent No.: US 8,538,496 B2
(45) Date of Patent: Sep. 17, 2013

(54) HANDHELD ELECTRONIC DEVICE

(75) Inventors: Chih-Shan Yeh, Taoyuan County (TW); Yi-Shen Wang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 0 days.

(21) Appl. No.: 13/207,448

(22) Filed: Aug. 11, 2011

(65) Prior Publication Data
US 2013/0040713 A1    Feb. 14, 2013

(51) Int. Cl.
*H04M 1/00*    (2006.01)

(52) U.S. Cl.
USPC ............ 455/575.4; 455/575.1; 455/90.3; 345/169

(58) Field of Classification Search
USPC ................... 455/90.3, 575.1, 575.4
See application file for complete search history.

(56) References Cited

U.S. PATENT DOCUMENTS

| 7,747,298 | B2* | 6/2010 | Kim et al. ............ 455/575.4 |
| 2010/0035670 | A1* | 2/2010 | Mine ............ 455/575.4 |
| 2011/0193783 | A1* | 8/2011 | Kim et al. ............ 345/169 |

* cited by examiner

*Primary Examiner* — Wayne Cai
*Assistant Examiner* — Shantell L Heiber
(74) *Attorney, Agent, or Firm* — Jianq Chyun IP Office

(57) ABSTRACT

A handheld electronic device including a first body, a second body, a fixing frame, a first sliding frame, and a second sliding frame is provided. Through the designs of the first sliding frame, the second sliding frame, and the fixing frame, the handheld electronic device has two sliding routes and accordingly can achieve two expanded states, wherein the two expanded states respectively expose two portions of the second body.

7 Claims, 6 Drawing Sheets

HANDHELD ELECTRONIC DEVICE

BACKGROUND OF THE INVENTION

1. Field of the Invention

The application generally relates to an electronic device, and more particularly, to a handheld electronic device.

2. Description of Related Art

A handheld electronic device is an electronic device which can be held and operated by a user, such as a mobile phone, a multimedia player, a personal digital assistant (PDA), a palm-top PC, a palmtop game console, or a handheld satellite navigator. Such an electronic device is usually very small and light therefore can be carried around conveniently. For example, earlier mobile phones usually adopt an upright design. However, folding mobile phones and sliding mobile phones have been developed in order to improve the portability of mobile phones without sacrificing the sizes of screens and keyboards thereof.

A folding mobile phone usually includes two parts that are connected with each other at one side through a hinge construction, and the screen and keyboard are respectively disposed on the insides of the two parts. Thus, a folding mobile phone can be folded when it is carried around and expanded when it is used. Similarly, a sliding mobile phone also has two parts. However, these two parts are connected with each other through a sliding construction, and the screen and keyboard are respectively disposed on the outside of the upper part and the inside of the lower part. Thus, the two parts of a sliding mobile phone can be overlapped when the sliding mobile phone is carried around and expanded when the sliding mobile phone is used.

Existing sliding mobile phones can be categorized into portrait and landscape styles. Regarding the sliding patterns, a portrait-style sliding mobile phone can only have its two parts slid along the longer axis, while a landscape-style sliding mobile phone can have its two parts slide along either the longer or the shorter axis. All sliding mobile phones are expanded in the same manner.

SUMMARY OF THE INVENTION

Accordingly, the application is directed to a handheld electronic device which can achieve two expanded states, wherein the two expanded states respectively expose two portions of a body of the handheld electronic device.

The application provides a handheld electronic device including a first body, a second body, a fixing frame, a first sliding frame, and a second sliding frame. The first body and the second body are suitable for sliding relative to each other along an operation direction, so as to allow the handheld electronic device to present a retracted state, a first expanded state, or a second expanded state. The fixing frame is located between the first body and the second body and is fixed to the first body. The first sliding frame is located between the first body and the fixing frame and has a first sliding route along the operation direction in relation to the fixing frame. The second sliding frame is located between the second body and the fixing frame. The second sliding frame and the second body interfere with each other in the operation direction, and the first sliding frame and the second sliding frame are coupled with each other in a sliding manner so that the second sliding frame has a second sliding route along the operation direction in relation to the first sliding frame. When the first sliding frame moves to a first end of the first sliding route and the second sliding frame moves to a first end of the second sliding route, the first body and the second body are expanded relative to each other so that the handheld electronic device achieves the first expanded state. When the first sliding frame moves to a second end of the first sliding route and the second sliding frame moves to a second end of the second sliding route, the first body and the second body are expanded relative to each other so that the handheld electronic device achieves the second expanded state. When the first body and the second body are in the retracted state, the first sliding frame is located between the first end and the second end of the first sliding route, and the second sliding frame is located between the first end and the second end of the second sliding route.

As described above, the application provides a simple sliding structure design by using sliding frames and a fixing frame such that a handheld electronic device can have two sliding routes. In other words, through such sliding structure design, the handheld electronic device can achieve two expanded states, wherein two portions of the second body are respectively exposed in the two expanded states.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
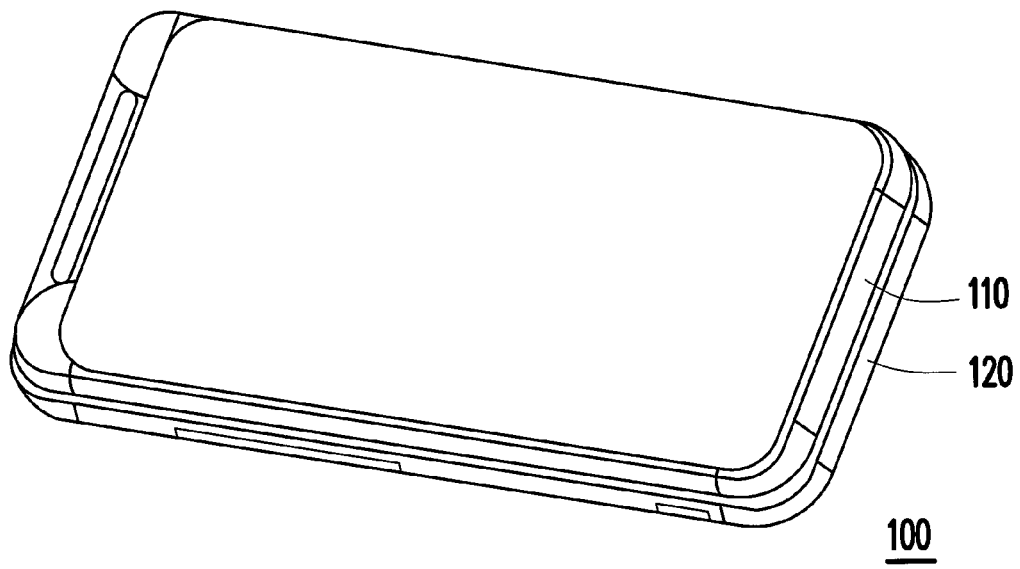
FIGS. 1A-1C sequentially illustrate a retracted state, a first expanded state, and a second expanded state of a handheld electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
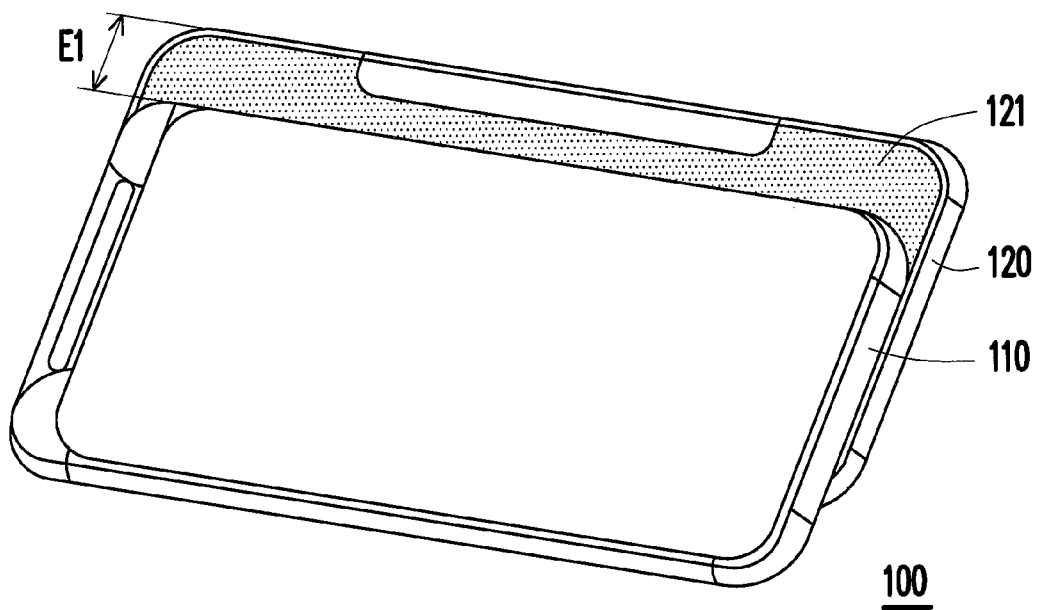
Figure 1C:
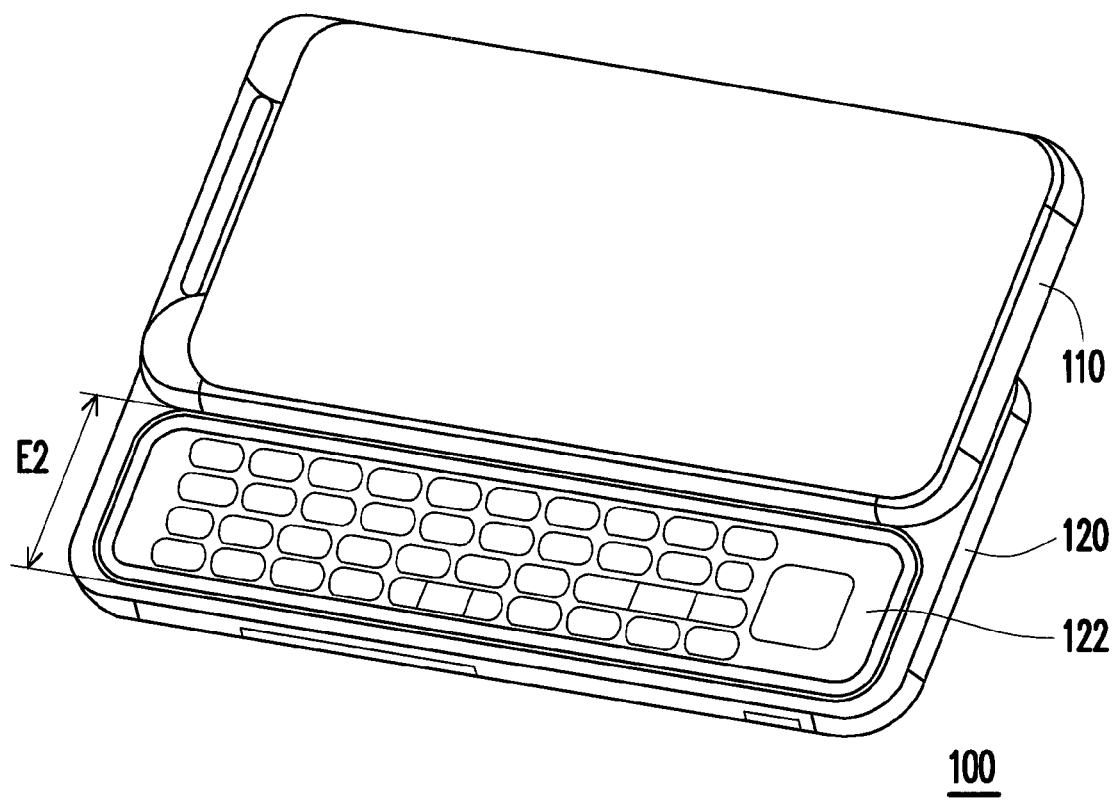

FIGS. 1A-1C sequentially illustrate a retracted state, a first expanded state, and a second expanded state of a handheld electronic device according to an embodiment of the invention. Referring to FIG. 1, the handheld electronic device 100 in the present embodiment includes a first body 110 and a second body 120. In the present embodiment, how the handheld electronic device 100 are retracted and expanded is described by assuming that the first body 110 has a display screen while the second body 120 has a speaker 121 and a keyboard 122. In the present embodiment, the speaker 121 and the keyboard 122 are located on the surface of the second body 120 that faces the first body 110 and are respectively close to two opposite long sides of the second body 120. However, the disposition of the speaker 121 and the keyboard 122 is not limited in the invention, and in other embodiments, the speaker 121 and the keyboard 122 may also be disposed at the same side of the second body 120 or respectively disposed on the first body 110 and the second body 120 according to user's requirement. The first body 110 and the second body 120 are suitable for sliding relative to each other along an operation direction, so as to allow the handheld electronic device 100 to present a retracted state (as shown in FIG. 1A), a first expanded state (as shown in FIG. 1B), or a second expanded state (as shown in FIG. 1C).

As shown in FIG. 1A, the handheld electronic device 100 in the present embodiment is in the retracted state. In this case, the first body 110 and the second body 120 overlap each other. In the retracted state, the first body 110 covers the speaker 121 and the keyboard 122 of the second body 120. As shown in FIG. 1B, the first body 110 and the second body 120 are expanded relative to each other so that the handheld electronic device 100 achieves the first expanded state. In the first expanded state, the first body 110 exposes the speaker 121 of the second body 120, and the exposed length is E1. As shown in FIG. 1C, the first body 110 and the second body 120 are expanded relative to each other so that the handheld electronic device 100 achieves the second expanded state. In the second expanded state, the first body 110 exposes the keyboard 122 of the second body 120, and the exposed length is E2. In the present embodiment, the operation direction of the handheld electronic device 100 is substantially parallel to the short axis of the second body 120. However, the invention is not limited thereto, and the handheld electronic device 100 may have other operation directions in other embodiments. In other words, the landscape mode is shown in the present embodiment. However, the portrait mode can be shown according to the present application.

Figure 2:
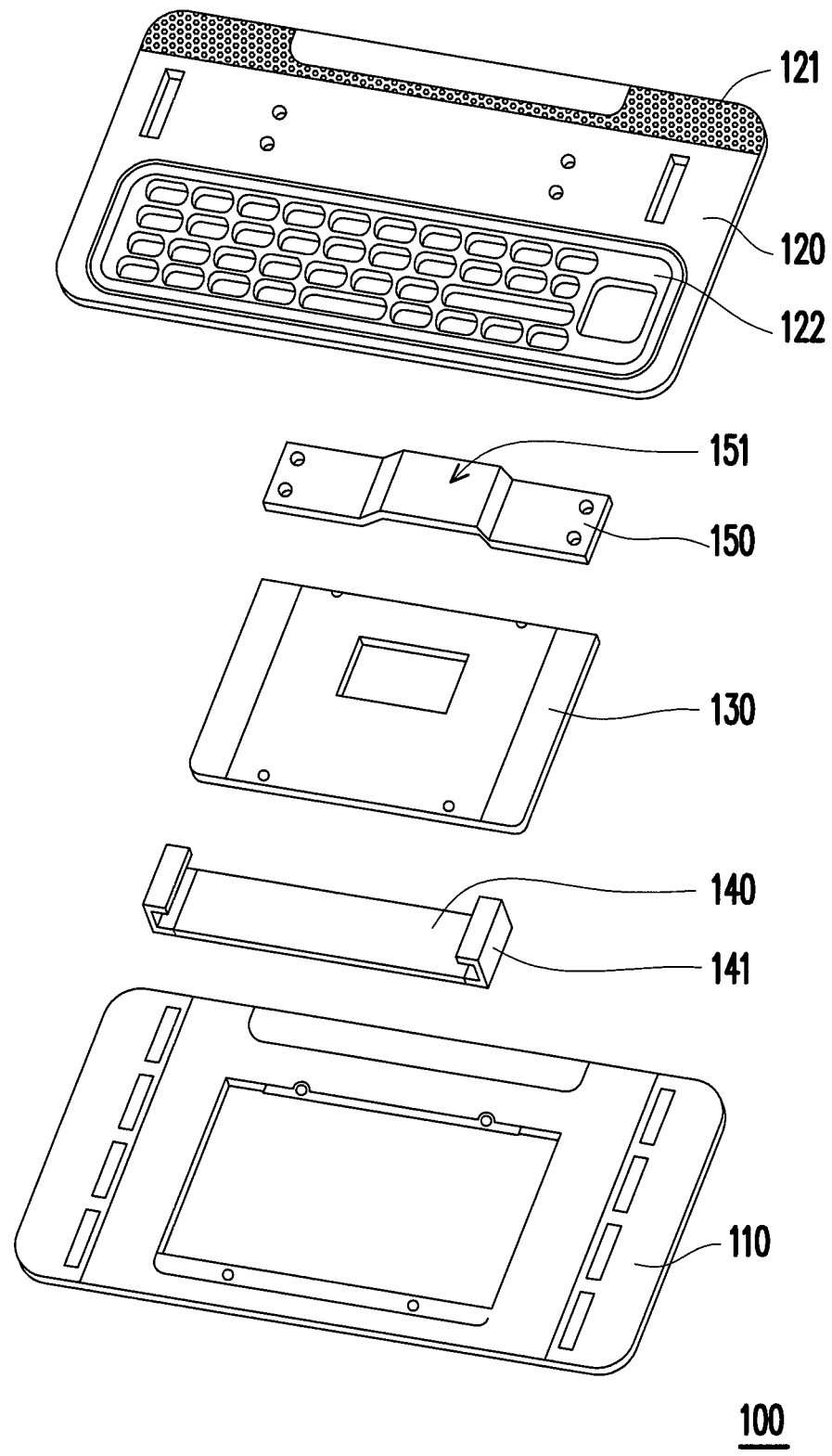
FIG. 2 is an explosion diagram of the handheld electronic device in FIG. 1.

Below, how the handheld electronic device 100 in the present embodiment achieves the retracted state and the two expanded states will be described. FIG. 2 is an explosion diagram of the handheld electronic device in FIG. 1. Referring to FIG. 2, the handheld electronic device 100 in the present embodiment further includes a fixing frame 130, a first sliding frame 140, and a second sliding frame 150. The fixing frame 130 is located between the first body 110 and the second body 120 and is fixed to the first body 110. The first sliding frame 140 is located between the first body 110 and the fixing frame 130, and two opposite ends of the first sliding frame 140 respectively have a clamp portion 141 locked to two opposite sides of the fixing frame 130. Thus, the first sliding frame 140 is suitable for sliding along the two opposite sides of the fixing frame 130 through the two clamp portions 141. The second sliding frame 150 is located between the second body 120 and the fixing frame 130 and is fixed to the second body 120. Additionally, two opposite ends of the second sliding frame 150 are respectively disposed on the two clamp portions 141 of the first sliding frame 140 in a sliding manner, and the first sliding frame 140 and the second sliding frame 150 are coupled with each other in a sliding manner.

To be specific, the first body 110 is fixed to the fixing frame 130. The first sliding frame 140 is assembled to two sides of the fixing frame 130 in a sliding manner through the two clamp portions 141, and the sliding direction thereof is parallel to the short axis of the second body 120. The first sliding frame 140 and the second sliding frame 150 are also assembled together in a sliding manner without departing from each other. The second sliding frame is fixed to the second body 120. Thus, the second body 120 can move along with not only the slide of the second sliding frame 150 relative to the first sliding frame 140 but also the slide of the second sliding frame 150 relative to the first body 110.

Figure 3:
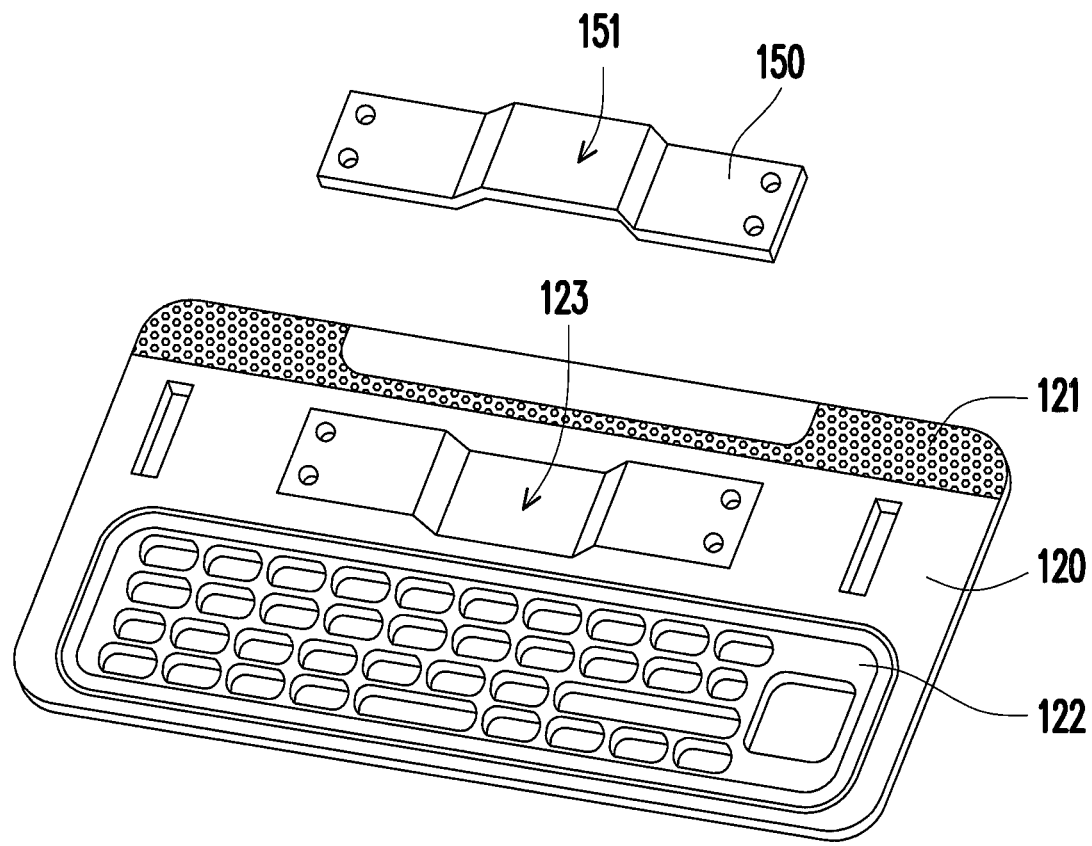
FIG. 3 is a diagram illustrating a second sliding frame and a second body of the handheld electronic device in FIG. 1.

In the present embodiment, the first body 110 is fixed to the fixing frame 130 through screws. However, the invention is not limited thereto, and in other embodiments, the first body 110 may also be fixed to the fixing frame 130 through welding, integral formation, or any other suitable technique. FIG. 3 is a diagram illustrating the second sliding frame 150 and the second body 120 of the handheld electronic device 100 in FIG. 1. In order to allow the second sliding frame 150 to drive the second body 120 to slide in a more stable manner, in the present embodiment, the second sliding frame 150 and the second body 120 are fixed together by disposing a bump 151 on the second sliding frame 150 and a recess 123 on the second body 120, wherein the bump 151 protrudes toward the second body 120, and the recess 123 contains and interferes with the bump 151. In order to show the design of the bump 151 and the recess 123 more clearly, the wrong side of the second body 120 is illustrated in FIG. 3.

Figure 4A:
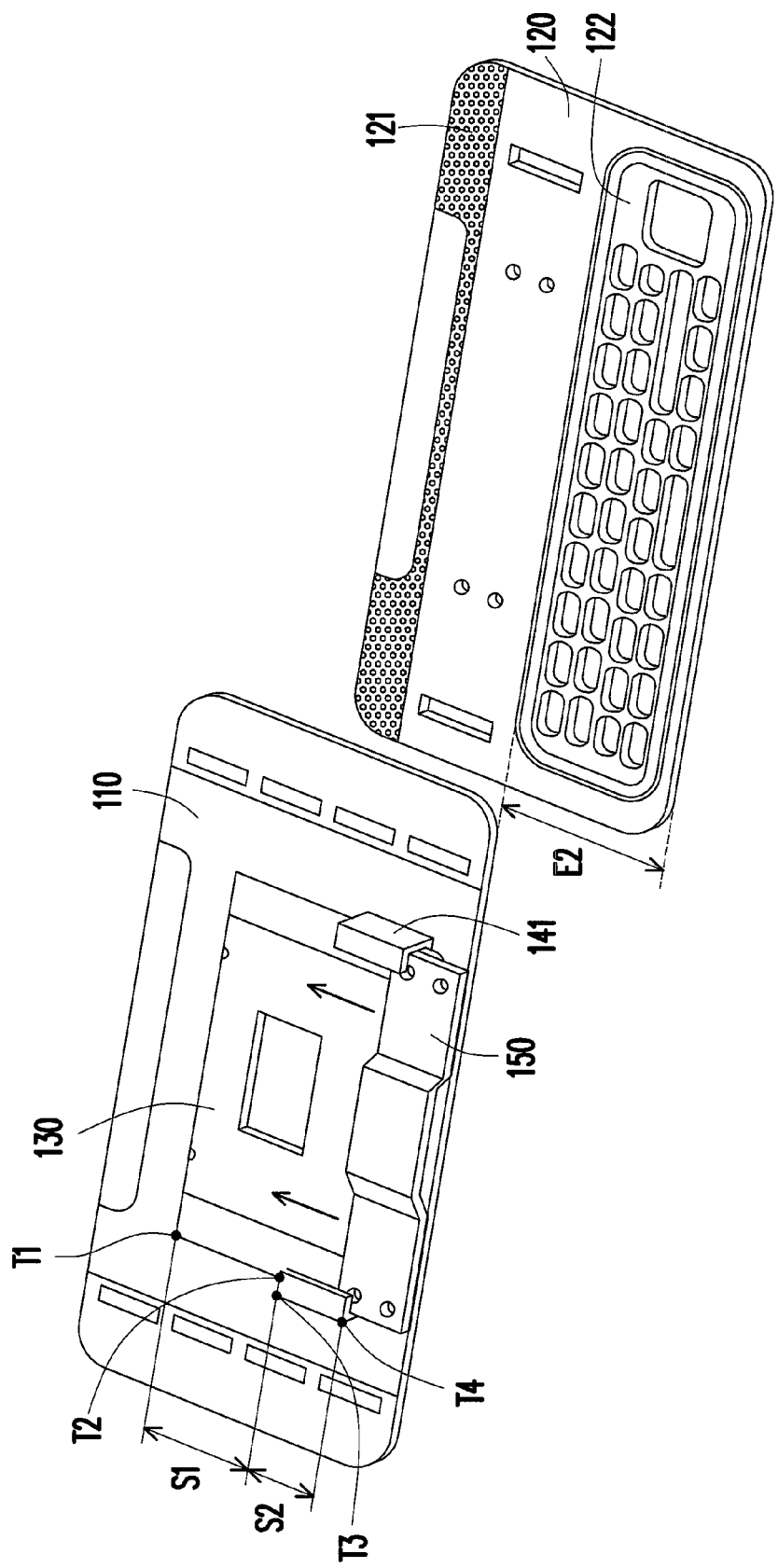
FIG. 4A and FIG. 4B are diagrams illustrating an operation procedure of the handheld electronic device in FIG. 1.
Figure 4B:
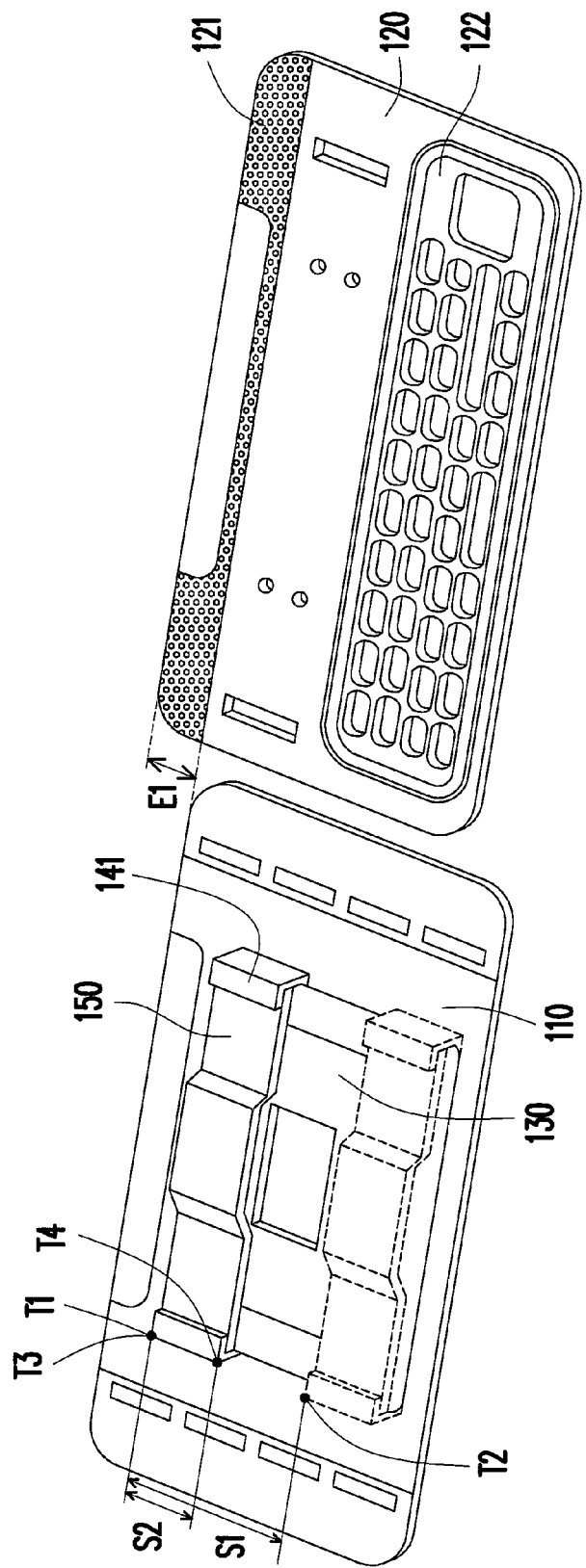

Next, the sliding operation of the handheld electronic device 100 in the present embodiment will be described. FIG. 4A and FIG. 4B are diagrams illustrating an operation procedure of the handheld electronic device 100 in FIG. 1. The sliding routes of the two bodies of the handheld electronic device 100 in the present embodiment will be described before the sliding operation of the handheld electronic device 100. In FIG. 4A, the second body 120 is shifted rightwards so that different components can be clearly shown in FIG. 4A. However, in order to reflect the exposed length of the second body 120, the direction of the second body 120 is not changed in FIG. 4A. Referring to FIG. 4A, the handheld electronic device 100 is in the second expanded state (i.e., the first body 110 exposes the keyboard 122 of the second body 120), and the exposed length of the second body 120 is E2. In the present embodiment, the first sliding frame 140 slides relative to the fixing frame 130 in the operation direction along a first sliding route S1, and the second sliding frame 150 slides relative to the first sliding frame 140 in the operation direction along a second sliding route S2. First, as shown in FIG. 4A, one end of the first body 110 is defined as a first end T1 of the first sliding route S1, and one end of the first sliding frame 140 is defined as a first end T3 of the second sliding route S2. Because the length of the second sliding route S2 is the distance between the first sliding frame 140 and the second sliding frame 150 when the two are slid relative to each other to the greatest extent (without being separated), the other end of the first sliding frame 140 is defined as a second end T4 of the second sliding route S2. Because the length of the first sliding route S1 is the distance for sliding the first sliding frame 140 from one end of the fixing frame 130 to the other end thereof, the second end T2 of the first sliding route S1 is the first end T3 of the second sliding route S2.

As shown in FIG. 4A, if the second sliding frame 150 drives the second body 120 to slide along the direction indicated by the arrows until the second sliding frame 150 is located between the first end T3 and the second end T4 of the second sliding route S2 and the first sliding frame 140 is located between the first end T1 and the second end T2 of the first sliding route S1, the first body 110 and the second body 120 are in the retracted state.

Referring to FIG. 4A again, if the second sliding frame 150 drives the second body 120 to slide along the direction indicated by the arrows until the first sliding frame 140 reaches the first end T1 of the first sliding route S1 and the second sliding frame 150 reaches the first end T3 of the second sliding route S2, the first body 110 and the second body 120 are in the first expanded state. Referring to FIG. 4B, the handheld electronic device 100 is in the first expanded state (i.e., the first body 110 exposes the speaker 121 of the second body 120), and the exposed length of the second body 120 is E1.

In the present embodiment, total route of the first body 110 and second body 120 moving relative to each other is substantially equal to the total of the first sliding route S1 and the second sliding route S2 (i.e., S1+S2). Besides, the total route of the first body 110 and the second body 120 moving relative to each other is also equal to the total of the exposed lengths of the second body 120 respectively in the first expanded state and the second expanded state (i.e., E1+E2). Thus, the lengths of the first sliding route S1 and the second sliding route S2 should be designed according to desired exposed lengths of the speaker 121 and the keyboard 122.

In the present embodiment, the first sliding route S1 is the sliding distance of the first sliding frame 140 and the second sliding frame 150 in relation to the fixing frame 130, the second sliding route S2 is the sliding distance between the first sliding frame 140 and the second sliding frame 150, and both the first sliding frame 140 and the second sliding frame 150 are disposed on the fixing frame 130 in a sliding manner. The second sliding route S2 is usually shorter than the first sliding route S1.

In summary, the application provides a simple sliding structure design by using sliding frames and a fixing frame such that a handheld electronic device can have two sliding routes. In other words, through such sliding structure design, the handheld electronic device can achieve two expanded states, wherein two portions of the second body are respectively exposed in the two expanded states. Thanks to the simple sliding structure design, the handheld electronic device can be made very slim and unlike other handheld electronic devices, can achieve two different expanded states.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A handheld electronic device, comprising:
   a first body;
   a second body, having a first part and a second part which are located on a surface of the second body that faces the first body and are respectively close to two opposite sides of the second body, wherein the first body and the second body are suitable for sliding relative to each other along an operation direction, so as to allow the handheld electronic device to present a retracted state, a first expanded state, or a second expanded state;
   a fixing frame, located between the first body and the second body and fixed to the first body;
   a first sliding frame, located between the first body and the fixing frame, having a first sliding route along the operation direction in relation to the fixing frame; and
   a second sliding frame, located between the second body and the fixing frame, wherein the second sliding frame and the second body interfere with each other in the operation direction, and the first sliding frame and the second sliding frame are coupled with each other in a sliding manner so that the second sliding frame has a second sliding route along the operation direction in relation to the first sliding frame, wherein
   when the first sliding frame moves to a first end of the first sliding route and the second sliding frame moves to a first end of the second sliding route, the first body and the second body are expanded relative to each other so that the handheld electronic device achieves the first expanded state, and the first body exposes the first part of the second body,
   when the first sliding frame moves to a second end of the first sliding route and the second sliding frame moves to a second end of the second sliding route, the first body and the second body are expanded relative to each other so that the handheld electronic device achieves the second expanded state, and the first body exposes the second part of the second body,
   when the first body and the second body are in the retracted state, the first sliding frame is located between the first end and the second end of the first sliding route, the second sliding frame is located between the first end and the second end of the second sliding route, and the first body covers the first part and the second part of the second body.

2. The handheld electronic device according to claim 1, wherein the second sliding route is shorter than the first sliding route.

3. The handheld electronic device according to claim 1, wherein two opposite ends of the first sliding frame respectively have a clamp portion locked to two opposite sides of the fixing frame, and the first sliding frame is suitable for sliding along the two opposite sides of the fixing frame through the two clamp portions.

4. The handheld electronic device according to claim 3, wherein two opposite ends of the second sliding frame are respectively disposed on the two clamp portions of the first sliding frame in a sliding manner.

5. The handheld electronic device according to claim 1, wherein the operation direction is substantially parallel to a long axis of the second body.

6. The handheld electronic device according to claim 1, wherein the second sliding frame has a bump protruding toward the second body, and the second body has a recess which is adapted to contain and interfere with the bump.

7. The handheld electronic device according to claim 1, wherein the first part comprises a speaker, and the second part comprises a keyboard.

* * * * *